Nov. 13, 1945. J. H. HAMMON 2,388,687
METHOD OF MAKING MULTIFOCAL OPHTHALMIC LENS BLANKS
Filed Dec. 18, 1942 4 Sheets-Sheet 1
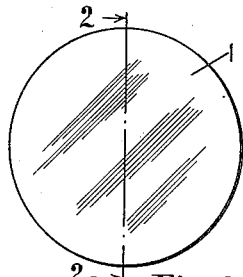  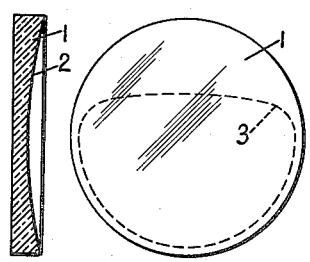 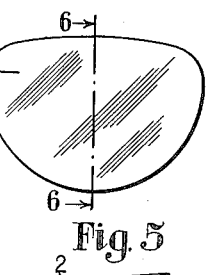
Fig.1  Fig.2  Fig.3  Fig.4  Fig.5
Fig.6
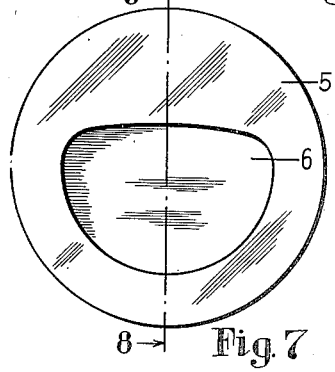 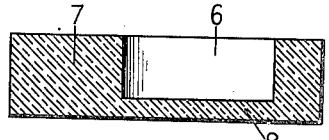 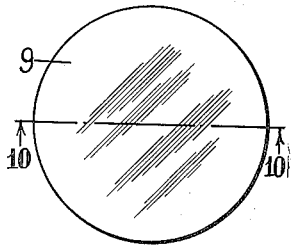
Fig.7  Fig.8  Fig.9
 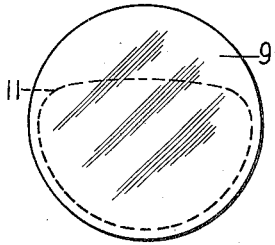 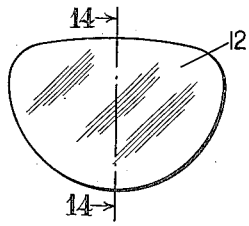
Fig.10  Fig.12  Fig.13
Fig.11
 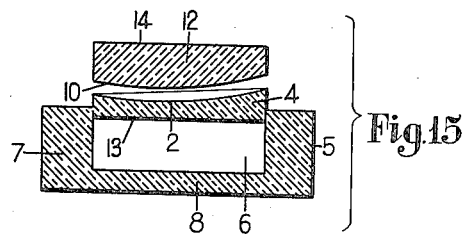
Fig.14  Fig.15
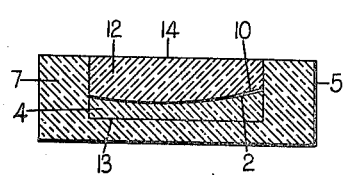
Fig.16
INVENTOR.
James H. Hammon.
BY
Cubitt, Mahony & Miller
ATTORNEYS

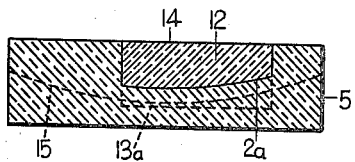
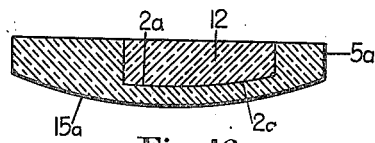
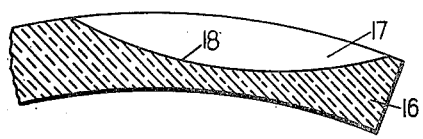
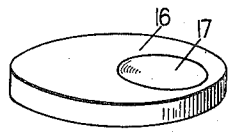
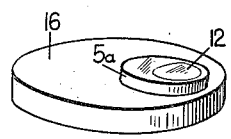
Fig. 17   Fig. 18   Fig. 19   Fig. 20   Fig. 21
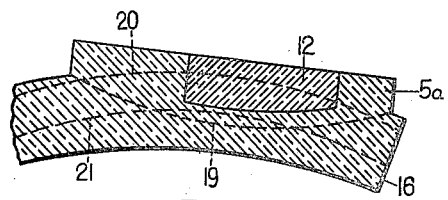
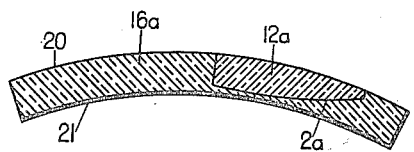
Fig. 22   Fig. 23
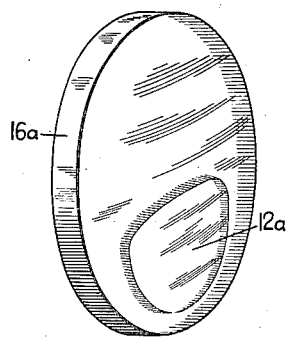
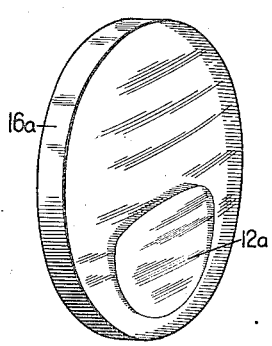
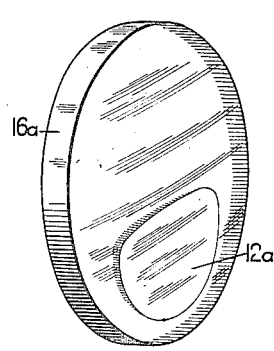
Fig. 24   Fig. 25   Fig. 26
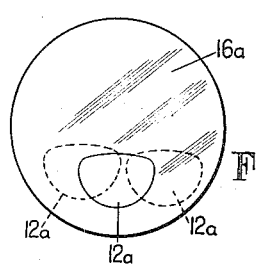
Fig. 27
INVENTOR.
James H. Hammon.
BY
ATTORNEYS Nov. 13, 1945.    J. H. HAMMON    2,388,687
METHOD OF MAKING MULTIFOCAL OPHTHALMIC LENS BLANKS
Filed Dec. 18, 1942    4 Sheets-Sheet 3

INVENTOR.
James H. Hammon.
BY
Curbett, Mohury + Miller
ATTORNEYS

Nov. 13, 1945.   J. H. HAMMON   2,388,687
METHOD OF MAKING MULTIFOCAL OPHTHALMIC LENS BLANKS
Filed Dec. 18, 1942   4 Sheets-Sheet 4

INVENTOR.
James H. Hammon.
BY
ATTORNEYS

Patented Nov. 13, 1945

2,388,687

UNITED STATES PATENT OFFICE 2,388,687

METHOD OF MAKING MULTIFOCAL OPHTHALMIC LENS BLANKS

James H. Hammon, Vincennes, Ind.; Alberta M. Hammon, executrix of said James H. Hammon, deceased Application December 18, 1942, Serial No. 469,417

2 Claims. (Cl. 88—54)

My invention relates to a method of making multifocal ophthalmic lens blanks. It has to do, more particularly, with the provision of lens blanks which permit of the production of bifocal, trifocal and other multifocal lenses completely adequate to the correction of defective vision.

This invention relates to improvements on the method disclosed in my Reissue Patent No. 18,427, dated April 19, 1932, and my Patent No. 2,029,479, issued February 4, 1936. In said patents, I described a method of making multifocal ophthalmic lens blanks which can be finished into lenses completely adequate to the correction of defective vision. By the method disclosed in said patents, it is possible to produce a multifocal ophthalmic lens blank which can be finished into the final lens in such a manner that the optical center of the minor segment or segments can be selectively located as desired. According to the method disclosed in said patents, a thick segment of glass of one index of refraction is embedded in a carrier portion of glass of a different index of refraction. The composite button, thus formed, is then ground to a predetermined curvature on one side thereof to expose one surface of the segment, the curvature depending upon the desired power of the segment in the finished lens to be formed by the thick segment of the composite button. A countersink surface is formed in a major blank of glass of the same index of refraction as the carrier portion of the composite button. The finished curved surface of the composite button is then fused to the countersink surface in the major blank. In the fusing operation, the carrier portion of glass becomes an indistinguishable part of the major blank. Thus, there is produced a multifocal ophthalmic lens blank consisting of a major blank having a thick segment embedded therein. By grinding the segment-carrying side of the blank, the optical centers of the segment and major blank may be selectively located. By grinding the opposite side of the blank to a prescribed curvature, a finished lens will be produced which will have the desired refractive powers in the minor and major portions of the lens.

To obtain various powers of minor portions in the finished lenses by the method described in said patents, it is necessary to provide a series of composite buttons having predetermined curves which differ from each other. Consequently, with such method, it is necessary to provide a series of major blanks with countersink curves varying from each other in the same manner as the curves of the series of composite buttons which are to be fused thereto. The countersink curve of each major blank must be of an accurate predetermined curvature depending upon the particular power it is desired to produce in the minor portion of the finished lens. Thus, since it is necessary to provide a series of major blanks with varying countersink curves which must be of accurate predetermined curvatures, the necessary grinding operations for producing a series of lens blanks of different powers is complicated. Furthermore, the composite buttons cannot be tested for accuracy and quality until they are fused to the major blanks, since some defect may result during the fusing operation. Thus, if any defects do occur during the fusing operation, the entire major blank, which carries the fused button, must be discarded.

One of the objects of my invention is to provide a method of making a multifocal ophthalmic lens blanks of such a nature that it will not be necessary to provide a series of major blanks having optical surfaces of varying curvatures formed thereon for receiving a series of composite buttons having varying curvatures, in order to produce a series of lens blanks having segments of varying powers.

Another object of my invention is to provide a method of making a composite button for use in a multifocal lens blank of the type indicated which will have elements of glass, of all of the refractive indices used in making the complete lens blank, so associated in the composite button that there will be little danger of defects occurring in the lens blank during the fusing of the composite button to the major blank.

Another object of my invention is to provide a method of making a composite button of the type indicated in the preceding paragraph which may be tested for accuracy and quality before being fused to the major blank.

In its preferred form, my invention contemplates the forming of a multifocal ophthalmic lens blank by forming a composite button which includes a segment of one index of refraction and a carrier portion of another index of refraction. The segment is of substantial thickness throughout its entire area and is of an index suitable for forming the minor portion of the finished lens. The carrier portion is of an index of refraction different from the segment portion but is of the same index of refraction as the major blank to which the composite button is to be fused. One surface of the segment is prepared to a desired predetermined curvature suitable for forming the required power. This segment is so embedded in the carrier portion that the segment is laterally surrounded by the carrier portion and the finished surface of the segment is completely covered by the carrier portion. Thus, the carrier button will consist of glass of all the indices of refraction used in making the finished lens.

Since the finished curved surface of the segment is completely covered by glass of the same index of refraction as the major blank to which the composite button is to be fused, the composite button can be fused to the major blank with little danger of any defects occurring at the contacting surfaces of the major blank and the composite button. Before the composite button is fused to the major blank, an optical surface is formed on that side of the composite button opposite to the side in which the segment is embedded. A similar complemental optical surface is formed on the major blank for receiving the optical surface on the composite button. These complemental surfaces may be of any desired curvature or may be flat, since the nature thereof will have no bearing on the power of the segment. Thus, in producing a series of lens blanks of varying powers, it is not necessary to have a series of major blanks which have button-receiving optical surfaces of varying powers. The button-receiving surface on all of the major blanks can be of the same nature. Furthermore, the composite buttons may be tested for accuracy and quality before being fused to the major blank, since the curved surface of the segment will already be fused to glass of the same index of refraction as the major blank. Consequently, there will be no danger of defects occurring during the fusing of the composite button to the major blank. Since the composite button can be tested for accuracy and quality before being fused to the major blank, if a rejection is necessary, this will not entail the expense of fusing the button to the major blank and the consequent loss of the major blank along with the expense of resurfacing a new major blank.

When the composite button is fused to the major blank, the carrier portion will become an indistinguishable part of the major blank since it is of the same index of refraction. Thus, there will result a major blank having a thick segment embedded in one surface thereof. Such surface of the blank may then be ground to the required curvature and in the desired manner to determine the power of the segment relative to the major blank and to selectively locate the optical centers of the segment and major blank relative to each other. To complete the final lens from the lens blank, the opposite surface of the blank is then ground to the prescribed curvature.

The preferred embodiment of my invention is illustrated in the accompanying drawings wherein similar characters of reference designate corresponding parts and wherein:

Figure 1 is a plan view of a piece of glass of an index suitable for forming a portion of the carrier portion.

Figure 2 is a sectional view taken substantially along line 2—2 of Figure 1.

Figure 3 is a view similar to Figure 2 showing one side of the piece of glass formed to a predetermined curvature.

Figure 4 is a plan view illustrating by dotted lines how a button of a selected shape may be cut from the piece of glass shown in Figure 3.

Figure 5 is a plan view of the button so produced.

Figure 6 is a sectional view taken substantially along line 6—6 of Figure 5.

Figure 7 is a plan view of a carrier portion of glass of the same index of refraction as the button of Figures 5 and 6 having a socket of the required shape and depth for receiving said button.

Figure 8 is a sectional view taken substantially along line 8—8 of Figure 7.

Figure 9 is a plan view of a piece of glass of an index of refraction differing from the glass of Figures 1 and 7 and being suitable for forming the minor segment of the lens blank.

Figure 10 is a sectional view taken substantially along line 10—10 of Figure 9.

Figure 11 is a view similar to Figure 10 and showing the piece of glass having a predetermined curved surface formed on one side thereof.

Figure 12 is a plan view of the glass of Figure 11 showing how a segment button of desired shape may be cut therefrom.

Figure 13 is a plan view of the segment button so produced.

Figure 14 is a sectional view taken substantially along line 14—14 of Figure 13.

Figure 15 is a sectional view showing the segment button of Figure 13 superimposed over the button of Figure 5 and both buttons positioned over the socket in the carrier portion of Figure 7.

Figure 16 is a similar view showing the three pieces of glass in assembled relationship before fusing.

Figure 17 is a similar view but showing the composite button after fusing.

Figure 18 is a similar view of the composite button having a curved surface polished and ground on one side thereof.

Figure 19 is a sectional view showing a major blank with a countersink formed therein for receiving the composite button of Figure 18.

Figure 20 is a perspective view of the major blank.

Figure 21 is a perspective view of the major blank with the composite button positioned in the countersink.

Figure 22 is a sectional view of the blank shown in Figure 21 illustrating by dotted lines how the opposite surfaces of the blank may be finished to the desired curvature.

Figure 23 is a sectional view showing the finished lens blank resulting from the unfinished blank of Figure 22.

Figure 24 is a perspective view of the finished lens blank of Figure 23 illustrating the segment embedded therein.

Figure 25 is a perspective view of a finished lens blank having a "base-up" prism.

Figure 26 is a similar view but showing the base of the prism at one side of the segment.

Figure 27 is a diagrammatic plan view illustrating how the segment may be located at different positions in the major blank.

Figure 28:
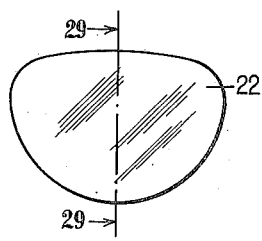
Figure 28 is a plan view of a segment button of glass of an index of refraction suitable for forming the minor segment of the finished lens.

With reference to the drawings, I have illustrated in Figures 1 to 22, inclusive, one way in which a multifocal ophthalmic lens blank may be made according to my invention.

I first select a piece of glass 1 which may be circular, as shown in Figure 1, or of any other shape. This glass is preferably flat, as shown in Figure 2, and is of an index of refraction which is the same as the main blank which will be referred to subsequently. For example, the glass 1 may be crown glass. I then take this piece of glass 1 and, as shown in Figure 3, surface it to form an optical surface 2 on one side thereof of a predetermined curvature. The surface 2 may be formed by grinding and polishing or in any other suitable manner. The curvature of the surface 2 will be accurately predetermined and will depend on the power desired for the segment of the finished lens.

As shown in Figure 4, the piece of glass 1 is then cut along the dotted line 3 to form the button 4 shown in Figures 5 and 6. The button 4 may be of any desired shape depending upon the shape of segment it is desired to provide in the finished lens. I prefer the shape shown in Figure 5, comprising a substantially flat upper boundary line, a lower boundary line which is greater than a semicircle and joined to the flat upper boundary line by curved arcs. As pointed out in my Patent 2,029,479, this particular shape of segment has a number of advantages.

I also select a flat carrier portion 5 of glass which is of the same index of refraction as the portion 1. A socket 6 is formed preferably entirely within this carrier portion 5 by any suitable method, such as hot pressing or molding. This socket 6 has a continuous bounding wall 7 of substantial depth. The top of the socket 6 is open but the button is closed by a wall 8 of glass. The socket 6 is of the same outline as the button 4 but is of considerably greater depth than the thickness of the button 4.

I next select a flat piece of glass 9 of circular shape, as shown in Figure 9, or of any other shape. This glass 9 is of an index of refraction suitable for forming the segment of the lens blank and is different from the index of refraction of the button 4 and carrier portion 5. For example, the glass 9 may be crown glass. As shown by comparison of Figures 10 and 11, one side of the piece of glass 9 is surfaced to form an optical surface 10 of predetermined curvature thereon. This surface may be formed by grinding and polishing or in other suitable manner. The curvature of the surface 10 will correspond to or closely approach the curvature of the surface 2 of the piece 1. As shown by the dotted line 11 in Figure 12, I then cut from the piece of glass 9 a segment button 12 which will be of the same shape as the button 4 and the socket 6. This segment button, as shown in Figure 14, will be of substantial thickness throughout its entire area. However, this thickness will be less than the depth of socket 6.

As shown in Figure 15, the next step is to insert the buttons 4 and 12 in the socket 6 of the carrier portion 5. The edges of the buttons and the wall 7 of the socket are polished surfaces. The button 4 will first be inserted with its unfinished surface 13 lowermost and with its curved finished surface 2 uppermost. The button 12 will have its unfinished surface 14 uppermost and its finished curved surface 10 lowermost. As shown in Figure 16, the unfinished lower surface 13 of member 4 will contact with the bottom of the socket 6. The surface 10 of button 12 will rest on the surface 2 of button 4. The buttons 4 and 12 will fill the socket 6. The assembled unit is then subjected to a fusing operation. The curvature of the surface 10 may be slightly different from that of the surface 2 so that as the member 12 softens, during fusing, it gradually settles onto the surface 2, forcing the air outwardly from between these two surfaces. During the fusing operation, as shown in Figure 17, the button 4 of glass becomes a part of the carrier portion 5 since it is of the same index of refraction. The segment button 12 will be fused to the button 4 and to the carrier portion 5. If desired, the pieces of glass 1 and 9 may first be fused together and a laminated button can be cut therefrom and be mounted in the socket 6. The laminated button may then be fused in the socket. The fused unit is then subjected to a surfacing operation, such as grinding and polishing, to remove part of the carrier portion and to form a finished surface on the side thereof opposite to where the segment 12 is disposed. The glass of this unit should be removed up to a point past the dotted line 13a (Figure 17), for example, along the curved dotted line 15. It is necessary to remove the glass past the line 13a which corresponds to the joint between button 4 and carrier portion 5 inasmuch as this may be a visible joint since the surface 13 and bottom of the socket 6 are not finished optical surfaces. However, it is important for the finished optical surface 10 of segment 12 to remain completely covered by the button 4 which will now be a part of carrier portion 5.

In this manner, the composite button shown in Figure 18 will be produced. It will consist merely of the segment button 12 and the carrier portion 5a which will be of different indices of refraction. The segment button 12 will be of substantial thickness throughout its entire area and will have the thick edge buried in the carrier portion 5a. Furthermore, it will preferably be entirely laterally surrounded by the carrier portion 5a. The segment 12 will have a lower surface 2a of exactly the same curvature as the surface 2 of the piece of glass 1. This curvature will be such that it will cooperate with the curvature to be produced on the outer surface of the complete lens blank to give the desired power to the segment 12.

The finished surface 15a on the composite button may be of any desired curvature regardless of the strength desired for the segment 12 to be incorporated in the lens. A main blank is then selected which will be of the same index of refraction as the carrier portion 5a. This blank 16 will preferably be of concavo-convex form. It may be of circular or other outline but is shown as circular in Figure 20. A countersink 17 is then formed in the convex surface of the blank 16 in any selected location relative to the optical center of the major blank 16. The bottom surface 18 of this countersink 17 is an optically finished surface which may be formed by a suitable method such as grinding and polishing. This curvature 18 will be complemental to the curvature of the surface 15a of the composite button. The composite button is then positioned in the countersink 17 with the surface 15a of the button in contact with the surface 18 of the countersink throughout its entire area. It is important that these surfaces 15a and 18 be exactly complemental to each other so that no distortion of the surface 2a of segment 12 will occur during the fusing of the composite button to the major blank. With the composite button positioned in the countersink, as shown in Figure 21, the entire assembled unit is then subjected to a fusing operation. This fusing operation will cause the carrier portion 5a of the composite button to fuse to the major blank 16, along the dotted line 19 in Figure 22, and become a part of the major blank since it is of the same index of refraction. To form a finished blank from this fused blank, it is merely necessary to grind and polish the segment-carrying convex surface to a predetermined convex curvature, such as along the dotted line 20, and the concave surface to a predetermined concave curvature, such as along the dotted line 21. The resulting finished lens blank, shown in Figure 23, will consist of a main portion 16a having a segment portion 12a embedded therein.

It will be apparent that with this method, the composite button shown in Figure 18 will consist of glass of the two indices of refraction used in making the complete lens blank. The segment 12 will already be fused along the surface 2a to glass of the same index of refraction as the major blank 16. The curvature 2a of the segment 12 will be a predetermined fixed curvature and will not be changed during fusing to the main blank. Furthermore, there will be practically no danger of defects occurring at the contacting surfaces 15a and 18, during the fusing operation, since these surfaces are formed on the carrier portion 5a and the major blank 16, respectively, which are of the same index of refraction. Consequently, the composite button shown in Figure 18 may be tested for strength and quality before being fused to the major blank 16. If any defects are present, the composite button is discarded before being fused to the major blank.

Another important advantage of my method is that it is not necessary to provide a series of major blanks 16 having countersinks formed therein of varying curvature in order to provide a series of blanks having segments of varying powers. The countersink surface 18 in all the major lens blanks may be the same and will correspond to the curvature of the surface 15a which is the same on all of the composite buttons. The various strength segments are provided in a series of composite buttons by variations in the curvature of the surface 2a. The surfaces 15a and 18 have no bearing on the power of the segment incorporated in the lens except that they must be complemental to prevent distortion of segment 12 during the fusing operation.

As described in my prior Patent No. 2,029,479, the optical center of the segment 12a may be selectively located as desired. This may be accomplished by the grinding and polishing operation illustrated in Figure 22 which may be varied to provide the base of the prism of the segment at any location along the boundary line of the thick segment. As shown in Figures 23 and 24, the segment may have a thick embedded edge entirely along its periphery. As shown in Figure 25, the base of the prism in the segment may be up. As shown in Figure 26, the base of the prism may be at one side. In Figure 27, I illustrate how the segment may be located at different positions within the lens blank. All of the possibilities of selectively locating the optical center of the segment described in my prior patent are still present with this improved method.

In Figures 28 to 41, inclusive, I have illustrated a different way in which a multifocal ophthalmic lens blank may be made according to my invention.

Figure 29:
Figure 29 is a sectional view taken substantially along line 29—29 of Figure 28.
Figure 30:
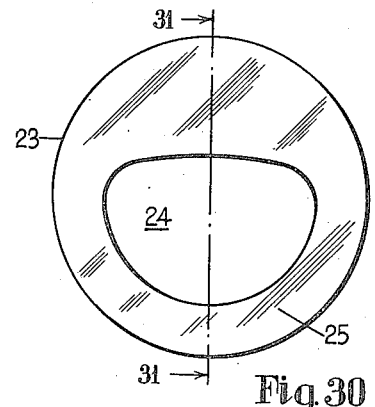
Figure 30 is a plan view of a carrier portion of glass of an index of refraction different from the button of Figure 28 and having a hole for receiving the button.
Figure 31:
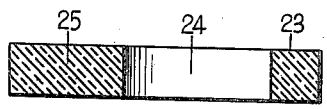
Figure 31 is a sectional view taken substantially along line 31—31 of Figure 30.

I first select a suitable piece of flat glass of an index of refraction suitable for forming the segment of the lens. This glass is cut into the desired shape to form a segment button 22 as shown in Figure 28. This segment 22 will be of substantial thickness throughout its entire area, as shown in Figure 29.

I also provide a carrier portion 23. This carrier portion is of an index of refraction different from that of the button 22 and corresponding to that of the major lens blank to be referred to subsequently. This carrier portion 23 is also of substantial thickness and a hole 24 is pressed or cut through the carrier portion. The hole 24 is of the same shape as the button 22 and is preferably formed entirely within the carrier portion 23. It extends entirely through the carrier portion, as shown best in Figure 31, thereby being of substantial depth, so that a boundary wall 25 of substantial depth is formed.

Figure 32:
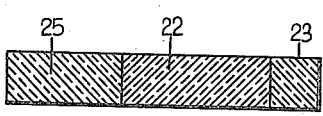
Figure 32 is a similar view showing the button of Figure 29 positioned and fused in the carrier portion of Figure 31.

The segment button 22 is then disposed in the carrier portion 23 and is fused therein as shown in Figure 32. The edge of button 22 and the wall 25 are polished surfaces. Then, one surface of the fused button is provided with an optical surface 26 of a suitable curvature. This surface may be formed by grinding and polishing or in any other suitable manner.

Figure 33:
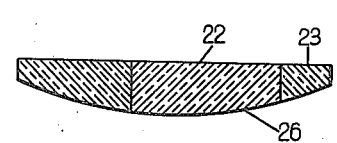
Figure 33 is a similar view showing a curved optical surface formed on one side of the composite button of Figure 32.
Figure 34:
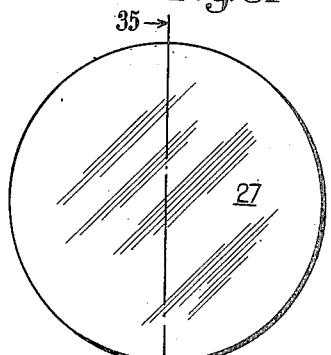
Figure 34 is a plan view of a carrier portion of glass of the same index of refraction as the carrier portion of Figure 30.
Figure 35:
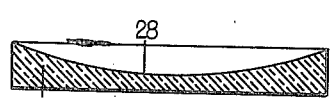
Figure 35 is a sectional view taken substantially along line 34——34 of Figure 34.

I next take a flat piece of glass 27 of an outline and area corresponding to that of the carrier portion 23. This piece of glass 27 will be of the same index of refraction as the carrier portion 23. On one surface thereof, as shown in Figure 35, I form an optical surface 28 of accurate predetermined curvature. This surface may be formed by grinding or polishing or in any other suitable manner. The surface 28 will determine the curvature of the inner surface of the segment to be incorporated in the finished lens. The button of Figure 33 is then superimposed on the piece of glass 27 in the manner indicated in Figure 36 with the surfaces 26 and 28 in association. The assembled unit is then fused to form the fused unit illustrated in Figure 37. The curvature of the surface 26 may be slightly different from that of the surface 28 to facilitate escape of air between these surfaces during the fusing operation.

Figure 36:
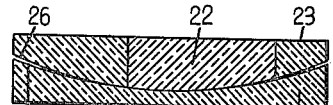
Figure 36 is a similar view showing the composite button of Figure 33 disposed in superimposed relationship to the button shown in Figure 35.

In the fusing of the assembled parts shown in Figure 36, the carrier portion 23 and the piece of glass 27 become an integral carrier portion since they are of the same index of refraction. The segment 22 will have an inner curved surface 28a which will be of exactly the same curvature as the surface 28 on the piece of glass 27. This surface 28a will be completely covered by that portion of the carrier portion formed by the piece of glass 27. The fused unit is then ground and polished, or otherwise formed, along the dotted line 29a of Figure 37 to produce a finished optical surface 29a on the side opposite to where the segment is disposed. Thus, the finished composite button shown in Figure 38 will consist of a carrier portion 23a in which the segment 22a is embedded. The segment 22a will be of substantial thickness throughout its entire area and its surface 28a will be completely covered by carrier portion 23a.

The main blank 30 is then selected and a countersink 31 is formed therein, as before. This countersink will have a curved optical surface 32 formed by a suitable method, such as grinding and polishing, which will be exactly complemental to the surface 29a on the composite button. The major blank 30 will be of the same index of refraction as the carrier portion 23a. The composite button of Figure 38 will then be positioned on the major blank 30 as before. The surface 29a of the composite button will be in contact with the countersink surface 32 throughout its entire area. The assembled unit is then subjected to a fusing operation to produce the fused blank shown in Figure 40. This fusing operation will cause the carrier portion 23a of the composite button to fuse to the major blank 30 along the dotted line 33 in Figure 40. The portion 23a will become a part of the major blank 30 since it is of the same index of refraction.

Figure 40:
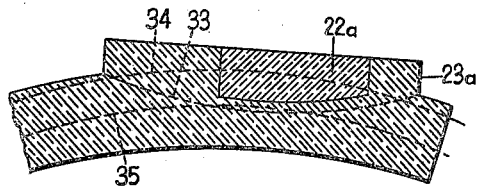
Figure 40 is a view showing the composite button of Figure 38 fused to the major blank of Figure 39.
Figure 41:
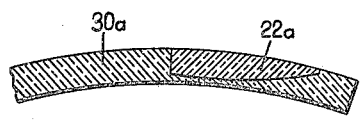
Figure 41 is a sectional view illustrating a finished blank formed from the blank of Figure 40.

To produce a finished blank of the type shown in Figure 41, it is merely necessary to grind and polish the segment-carrying convex surface to a predetermined convex curvature, such as along the dotted line 34 of Figure 40, and the concave surface to a predetermined concave curvature, such as along the dotted line 35. The resulting finished lens blank will consist of a main portion 30a having a segment portion 22a embedded therein.

Figure 38:
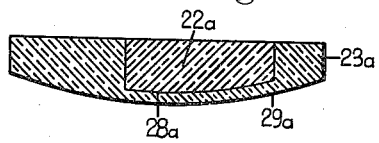
Figure 38 is a similar view showing the final composite button with a curved surface formed on one side thereof.
Figure 37:
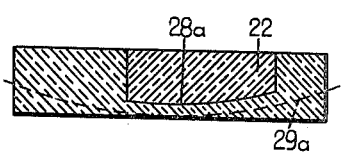
Figure 37 is a similar view showing the two buttons fused to each other.
Figure 39:
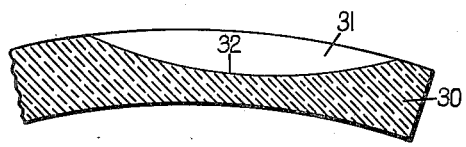
Figure 39 is a sectional view of a major blank having a countersink formed therein for receiving the button of Figure 38.

It will be apparent that with this form of my method, the composite button shown in Figure 38 will be substantially the same as that shown in Figure 18. Consequently, the composite button shown in Figure 38 may be tested for strength and quality before being fused to the major blank 30. If defective, it may be discarded before being fused to the major blank.

With this form of my method also it is not necessary to provide a series of major blanks 30 with countersinks therein of varying curvature in order to provide a series of blanks having segments of varying powers. The countersink surface in all the main blanks may be the same. The various strengths segments are provided in a series of composite buttons by variations in the curvatures of the surface 28. The surfaces 29a and 32 have no bearing on the power of the segment incorporated in the lens except that they must be complemental to prevent distortion of segment 22a during fusing of the composite button to the major blank.

Figure 42:
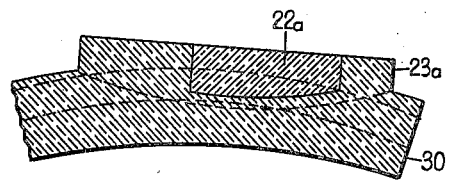
Figure 42 is a view similar to Figure 40 but illustrating how the blank may be ground in a different manner to locate the optical center differently.
Figure 43:
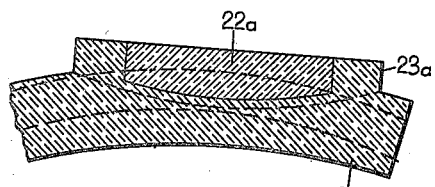
Figure 43 is a similar view illustrating another way of grinding the blank.

To produce different locations of the optical center of the embedded segment, as described with reference to Figures 24, 25 and 26, the fused blank may be surfaced according to prescription in different ways as illustrated by the dotted lines in Figures 42 and 43. Figure 40 simulates the conditions illustrated in Figure 24, Figure 42 simulates the conditions illustrated in Figure 25, and Figure 43 simulates the conditions illustrated in Figure 26.

Figure 44:
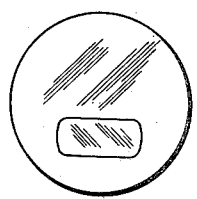
Figure 44 is a plan view illustrating a different shape for the segment.
Figure 45:
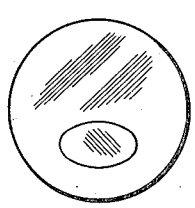
Figure 45 is a similar view illustrating another shape for the segment.

The embedded segment may assume various shapes. Two of these shapes are illustrated in Figures 44 and 45 but it is possible to provide many other shapes.

Figure 46:
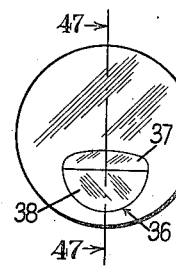
Figure 46 is a plan view of a trifocal lens blank which may be made according to my invention.
Figures 47, 48:
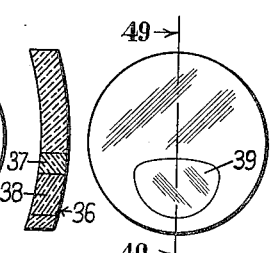
Figure 47 is a sectional view taken substantially along line 47—47 of Figure 46.
Figure 48 is a plan view of another form of trifocal lens blank which may be made according to my invention.

My method may also be used to provide a trifocal lens blank of the type shown in Figures 46 and 47. To make a trifocal lens blank of this type it will merely be necessary to have the segment 36 formed of two pieces of glass 37 and 38 which are different from each other and also from the major blank. In making a trifocal, the segment button 12 of Figure 13 or the segment button 22 of Figure 28 will be formed of two pieces of glass of different indices of refraction.

Figure 49:
Figure 49 is a sectional view taken substantially along line 49—49 of Figure 48.

A trifocal lens blank of the type indicated in Figures 48 and 49 may also be produced according to my invention. A segment 39 of a single piece of glass may be incorporated in the lens blank according to my method. This segment 39 will consist of two portions of different power and may be produced in the manner described in my co-pending application Serial Number 469,418, filed December 18, 1942.

Figure 50:
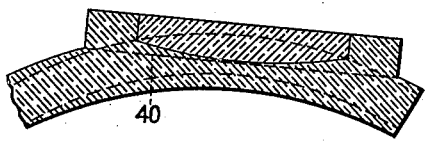
Figure 50 is a sectional view illustrating a modified type of lens blank made according to my invention.
Figure 51:
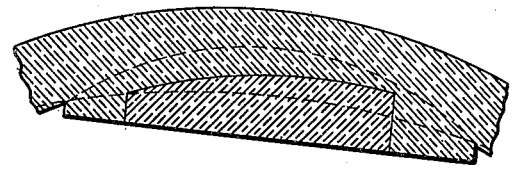
Figure 51 is a similar view illustrating another modification of my invention.

As previously indicated, the cooperating surfaces 15a and 18 of the composite button and major blank, respectively, or the cooperating surfaces 29a and 32 need not be any definite curvature. It is merely necessary that they be complemental to each other. They may even be flat, as shown in Figure 50, where the composite button is joined to the major blank along a flat line 40. Also, as shown in Figure 51, the composite button may be joined to the concave side of the major lens blank.

Figure 52:
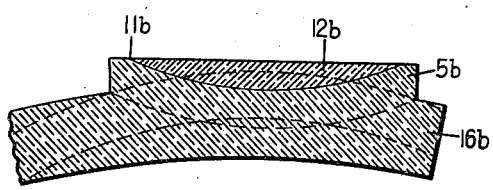
Figure 52 is a similar view illustrating still another modification of my invention.

It is important, as set forth in my prior patents, to produce a blank having a thick embedded segment. However, my method can be used for producing a blank of the type shown in Figure 52. This blank will consist of a main blank 16b, having a countersink therein with a carrier portion 5b, of the same index of refraction as the blank disposed therein. The segment 12b will have a feather edge 11b. This type of segment has the limitation that the optical center is always at the center of the segment.

It will be apparent from the above description that I have provided a method of making a multifocal ophthalmic lens blank of such a nature that it will not be necessary to provide a series of major blanks having optical surfaces of varying curvatures formed thereon in order to produce a series of lens blanks having segments of varying powers. The composite button produced according to my invention may be tested for strength and quality before being fused to the major blank, resulting in considerable saving if it must be discarded because of defects.

Many of the advantages of my method of making a lens blank have been discussed above and others will be readily apparent.

Having thus described my invention, what I claim is:

1. A method of forming a multifocal ophthalmic lens blank which comprises forming a button receiving surface on a major blank, forming a carrier portion of the same index of refraction as the major blank, said carrier portion having a socket formed therein, said socket being of substantial depth but not extending completely through said carrier, the shoulder and bottom portion of said socket being optically finished, providing a segment with a finished optical surface on one side thereof, said segment being of an index of refraction different from the major blank and said carrier, said segment being of substantial thickness throughout its entire area, said segment being of substantially the same shape as the socket formed in the carrier, embedding said segment in said socket in such a manner that the segment is substantially laterally surrounded by the carrier portion so as to provide a thick embedded shoulder around the segment, said segment having its finished optical surface in contact with the complimental finished optical surface of the socket thus preventing distortion of the finished optical surface during the subsequent fusing operation which forms the composite button, finishing one surface of said composite button so that it can be mounted in the button receiving surface of the major blank, and fusing the composite button to the major blank while maintaining all portions of the segment out of contact with said major blank.

2. A method of forming a multifocal ophthalmic blank which comprises forming a button receiving surface on a major blank, forming a carrier portion of the same index of refraction as the major blank, said carrier portion having a socket formed therein, said socket being of substantial depth, providing an insert portion having a finished optical surface forming on one side thereof, said portion being of the same index of refraction as said carrier, embedding said portion in the socket with its finished optical surface upwardly, forming a segment with a finished optical surface on one side thereof, said segment being of an index of refraction different from the major blank and said carrier, said segment being of substantial thickness throughout its entire area, said segment being of substantially the same shape as the socket in the carrier, embedding said segment in said socket in such a manner that the segment is substantially laterally surrounded by the carrier portion so as to provide a thick embedded shoulder around the segment, said segment having its finished optical surface faced downwardly in contact with the complimental finished optical surface of the insert portion in said socket thus preventing distortion of the finished optical surface of the segment during the subsequent fusing operation which forms the composite button, and finishing one surface of said composite button so that it can be mounted in the button receiving surface of the major blank, and fusing the composite button to the major blank while maintaining all portions of the segment out of contact with said major blank.

JAMES H. HAMMON.